May 31, 1955  R. J. DAVIES  2,709,383
TIRE VALVE MANIPULATING TOOL
Filed April 26, 1952
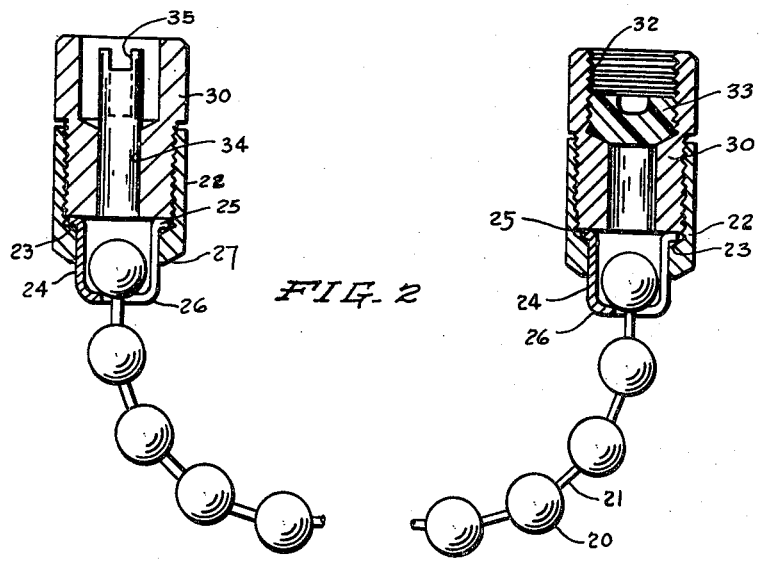
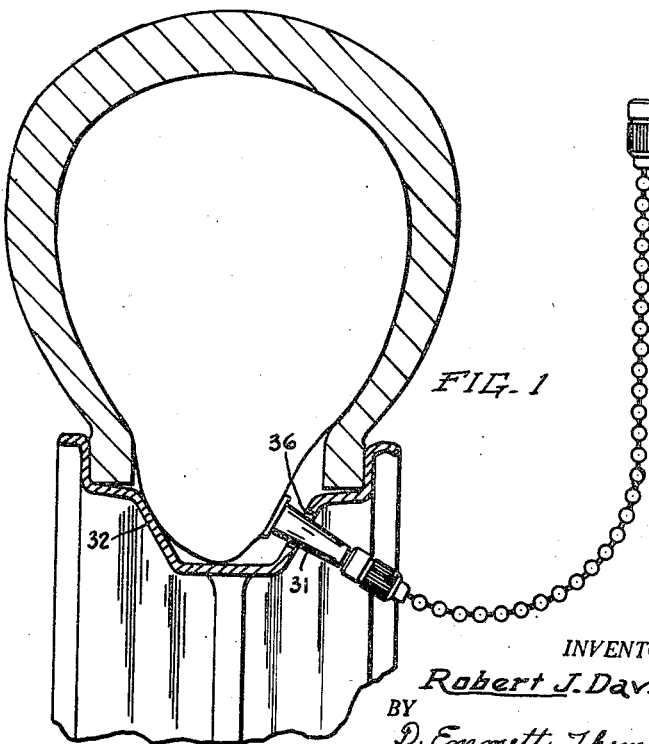
INVENTOR.
Robert J. Davies
BY
D. Emmett Thompson
Attorney

United States Patent Office 2,709,383
Patented May 31, 1955

2,709,383
TIRE VALVE MANIPULATING TOOL

Robert J. Davies, Syracuse, N. Y.

Application April 26, 1952, Serial No. 284,624

1 Claim. (Cl. 81—15.2)

This invention relates to an improved tool for manipulating the valve stems of automotive tires in mounting the tires on the wheels. In mounting tires having relatively great cross sectional dimension, especially large truck tires, difficulty is encountered in getting the valve stem of the inner tube through the hole in the rim of the wheel. In order to facilitate the manipulation of the stem, it is common practise to attach a coupling to the end of the valve stem of the partly inflated tube mounted in the casing. This coupling is provided with a flexible element which is extended through the hole in the rim of the wheel upon the initial mounting of the tire. After the casing has been properly mounted on the rim of the wheel, the valve stem is manipulated through the hole in the rim by the flexible element and the coupling attached thereto.

Tools of this type now available on the market have a number of disadvantages including the formation of the coupling which has a tendency to catch onto the rim when it is attempted to pull the tool and the valve stem through the hole, and the tendency of the flexible element to become kinked within the tire, rendering it difficult, or impossible, to pull the coupling and the valve stem through the hole in the rim.

This invention has as an object a tire valve tool of improved construction and which is particularly convenient to manipulate without catching on the rim, or becoming kinked or otherwise fast on the inner side of the rim. Also, the tool may be readily disassembled for repair without the use of tools.

The invention consists in the novel features and in the combinations and constructions hereinafter set forth and claimed.

In describing this invention, reference is had to the accompanying drawing in which like characters designate corresponding parts in all the views.

In the drawings—

Figure 1 is an elevational view of a tire valve tool embodying my invention and including a cross sectional view of the tire and wheel rim.

Figure 2 is a view showing the coupling members attached to each end of the flexible element in vertical or axial cross section.

The flexible element of the tool consists of a length of bead chain which consists of a series of ball members 20 connected by connecting bars 21, the ball elements being attached to the bars so as to have a rotatable or swiveling motion relatively thereto. The coupling members consist of a cylindrical sleeve 22 formed at one end with an internal annular shoulder 23. The sleeves 22 are connected to each end of the chain and have a swivel action in connection therewith. The chain is connected to the sleeves by a cup-shaped member 24 formed at its open end with a radially extending flange 25 positioned on the shoulder 23 and with the closed end of the cup member extending outwardly and being rounded at the joinder of the side walls and the bottom wall, as shown at 26. The end of the sleeve 22 is of conical formation, as shown at 27.

The opposite end portion of the sleeves 22 is threaded internally to receive a plug member 30, the inner end of which engages the flange 25 of the cup members and maintains the same seated on the shoulder 23. The outer end of the plug member 30 is formed with an aperture to receive the end of the valve stem 31. One of the plug members 30 is internally threaded, as at 32, for threaded connection to the valve stem 31. A gasket 33 is positioned in the bottom of the recess and serves to retain air in the partially inflated tube during mounting of the tire on the rim 32. In the coupling assembly at the opposite end of the chain, the plug 30 has fixedly mounted therein a pin 34 extending into the apertured end of the plug and being formed with a transversely extending slot 35, this coupling assembly being used to remove the core from the tire stem. The entire coupling assemblies, including the sleeve 22 and the plug 30, are readily swiveled on the chain.

In the event the bead chain should become broken, it may be readily replaced, or another one of the beads 20 attached to the coupling assemblies by removing the plug 30 and moving the cup member 24 axially through the sleeve 22, whereupon another one of the beads 20 may be positioned in the cup member, the cup member returned against the shoulder 23, and the plug 30 replaced. Due to the formation of the cup members 24 and their arrangement in the end portions of the sleeves, the coupling is readily pulled through the opening 36 in the wheel rim regardless of the initial location of the tire stem within the tire casing.

What I claim is:

A tire valve tool comprising a length of bead chain, a sleeve formed with an internal annular shoulder at one end, a cup member positioned in said sleeve with the closed end of said member extending outwardly from the sleeve and said cup member having its open end formed with a radial flange overlying said shoulder, said cup member being dimensioned to receive a ball element of the chain, the side wall of said cup being formed with a slot extending from the open end of said member to the bottom wall thereof and inwardly across the bottom wall to the center thereof for receiving a connecting bar of the chain, a plug member having a reduced end portion threaded in said sleeve and compressing the flange of said cup member against the shoulder of said sleeve, the outer end portion of the plug being internally threaded for attachment to the tire valve stem, the external diameter of the outer end portion of said plug being equal to or less than the external diameter of the sleeve.

References Cited in the file of this patent

UNITED STATES PATENTS

| | | |
|---|---|---|
| 1,308,219 | Brucker | July 1, 1919 |
| 1,548,755 | Sattler | Aug. 4, 1925 |
| 1,607,521 | Frankenberger | Nov. 16, 1926 |
| 2,579,657 | Douglas | Dec. 25, 1951 |